(12) United States Patent
Junghähnel et al.

(10) Patent No.: US 11,845,376 B2
(45) Date of Patent: Dec. 19, 2023

(54) RADAR AND LIGHT EMISSION ASSEMBLY FOR VEHICLES FOR EMITTING LIGHT AND RADAR RADIATION, AND METHOD AND USE

(71) Applicants: Fraunhofer-Gesellschaft zur Förderung der angewandten Forschung e. V., Munich (DE); Rheinisch-Westfälische Technische Hochschule (RWTH) Aachen, Aachen (DE)

(72) Inventors: Manuela Junghähnel, Dresden (DE); Thomas Preussner, Dresden (DE); Sebastian Winkler, Dresden (DE); Sofian Hamid, Aachen (DE); Korbinian Schraml, Aachen (DE); Jörg Pamp, Aachen (DE); Dirk Heberling, Gonnersdorf (DE); Christian Hördemann, Aachen (DE); Ludwig Pongratz, Aachen (DE); Patrick Gretzki, Aachen (DE); Arnold Gillner, Aachen (DE)

(73) Assignees: Fraunhofer-Gesellschaft zur Förderung der angewandten Forschung e. V., Munich (DE); Rheinisch-Westfälische Technische Hochschule (RWTH) Aachen, Aachen (DE)

( * ) Notice: Subject to any disclaimer, the term of this patent is extended or adjusted under 35 U.S.C. 154(b) by 283 days.

(21) Appl. No.: 17/285,951

(22) PCT Filed: Oct. 16, 2019

(86) PCT No.: PCT/EP2019/078054
§ 371 (c)(1),
(2) Date: Apr. 16, 2021

(87) PCT Pub. No.: WO2020/079060
PCT Pub. Date: Apr. 23, 2020

(65) Prior Publication Data
US 2021/0387563 A1    Dec. 16, 2021

(30) Foreign Application Priority Data

Oct. 17, 2018   (DE) .................... 10 2018 217 774.0

(51) Int. Cl.
*B60Q 1/00*        (2006.01)
*B60Q 1/04*        (2006.01)
(Continued)

(52) U.S. Cl.
CPC ............. *B60Q 1/0023* (2013.01); *B60Q 1/04* (2013.01); *G01S 7/03* (2013.01); *G01S 13/931* (2013.01);
(Continued)

(58) Field of Classification Search
CPC   B60Q 1/0023; B60Q 1/04; G01S 7/03; G01S 13/931; G01S 2013/93277; H01Q 1/3233; H01Q 1/3291; H01Q 19/10
See application file for complete search history.

(56) References Cited

U.S. PATENT DOCUMENTS

5,008,678 A * 4/1991 Herman ................ G01S 13/931
                                            342/158
5,313,213 A * 5/1994 Neumann ............ H01Q 1/3233
                                            343/711
(Continued)

FOREIGN PATENT DOCUMENTS

| DE | 19607653 A1 | 9/1997 |
|----|-------------|--------|
| DE | 19632252 A1 | 1/1998 |

(Continued)

*Primary Examiner* — Peter M Bythrow (74) *Attorney, Agent, or Firm* — The Webb Law Firm (57) ABSTRACT

Provided is a radar and light emission assembly for emitting light and radar radiation and for detecting at least reflected radar radiation including: a headlight including a light-transparent headlight cover, and a light source, and a light reflector; a radar module, which is arranged behind the headlight cover, integrated in the headlight and including a radar antenna unit. The radar and light emission assembly has at least one radar radiation-forming mechanism, in particular a frequency-selective radar radiation-forming mechanism, including a radar radiation-forming mechanism, which is integrated in the headlight cover. The application of the radar technology, integrated in the headlight, can be further optimized hereby. The invention further relates to a method and a use for a radar and light emission assembly of this type.

16 Claims, 3 Drawing Sheets

(51) Int. Cl.
  *G01S 7/03* (2006.01)
  *G01S 13/931* (2020.01)
  *H01Q 1/32* (2006.01)
  *H01Q 19/10* (2006.01)

(52) U.S. Cl.
  CPC ......... *H01Q 1/3233* (2013.01); *H01Q 1/3291* (2013.01); *H01Q 19/10* (2013.01); *G01S 2013/93277* (2020.01)

(56) References Cited

U.S. PATENT DOCUMENTS

| | | | | |
|---|---|---|---|---|
| 5,446,470 A * | 8/1995 | Avignon | ............ | B60Q 1/0023 343/712 |
| 5,467,072 A * | 11/1995 | Michael | ............ | G01S 13/931 340/901 |
| 5,963,172 A * | 10/1999 | Pfizenmaier | ............ | G01S 7/03 343/712 |
| 6,380,883 B1 * | 4/2002 | Bell | ............ | G01S 13/931 342/70 |
| 6,885,349 B2 * | 4/2005 | Hickel | ............ | H01Q 1/3291 343/711 |
| 7,535,406 B2 * | 5/2009 | Teranishi | ............ | G01S 17/931 342/70 |
| 7,973,696 B2 * | 7/2011 | Puscasu | ............ | H01Q 15/0066 342/13 |
| 8,310,404 B2 * | 11/2012 | Kishimoto | ............ | G08G 1/095 343/720 |
| 8,803,728 B2 * | 8/2014 | Yonemoto | ............ | H01Q 1/3225 362/539 |
| 8,922,435 B2 * | 12/2014 | Fontecchio | ............ | H01Q 9/16 343/700 MS |
| 9,647,325 B2 * | 5/2017 | Geary | ............ | H01Q 21/065 |
| 2003/0034926 A1 * | 2/2003 | Veerasamy | ............ | H01Q 1/36 343/711 |
| 2005/0068251 A1 * | 3/2005 | Ebling | ............ | H01Q 3/247 343/911 L |
| 2005/0151698 A1 * | 7/2005 | Mohamadi | ............ | H01Q 1/38 343/700 MS |
| 2008/0158045 A1 * | 7/2008 | Teranishi | ............ | B60Q 1/076 342/70 |
| 2008/0158897 A1 | 7/2008 | Nakamura et al. | | |
| 2011/0249304 A1 | 10/2011 | Kaise | | |
| 2011/0279304 A1 | 11/2011 | Yonemoto et al. | | |
| 2014/0247349 A1 | 9/2014 | Heard | | |
| 2016/0064806 A1 * | 3/2016 | Geary | ............ | H01Q 1/3233 343/713 |
| 2016/0359235 A1 * | 12/2016 | Driscoll | ............ | G01S 13/42 |
| 2017/0098888 A1 * | 4/2017 | Geary | ............ | H01Q 1/3283 |
| 2020/0101887 A1 * | 4/2020 | Cha | ............ | B60Q 1/0023 |
| 2020/0101889 A1 * | 4/2020 | Iwai | ............ | B60Q 1/04 |
| 2020/0386381 A1 * | 12/2020 | Aizawa | ............ | F21S 43/50 |
| 2021/0387563 A1 * | 12/2021 | Junghähnel | ............ | G01S 13/931 |
| 2022/0134939 A1 * | 5/2022 | Maruyama | ............ | F21S 41/275 342/175 |
| 2022/0352622 A1 * | 11/2022 | Choudhury | ............ | H04W 4/40 |

FOREIGN PATENT DOCUMENTS

| | | |
|---|---|---|
| DE | 19731754 A1 | 2/1999 |
| DE | 102011115829 A1 | 4/2013 |
| FR | 2717131 A1 | 9/1995 |
| JP | 2001313521 A | 11/2001 |
| JP | 2008186740 A | 8/2008 |

* cited by examiner

RADAR AND LIGHT EMISSION ASSEMBLY FOR VEHICLES FOR EMITTING LIGHT AND RADAR RADIATION, AND METHOD AND USE

CROSS-REFERENCE TO RELATED APPLICATIONS

This application is the United States national phase of International Application No. PCT/EP2019/078054 filed Oct. 16, 2019, and claims priority to German Patent Application No. 10 2018 217 774.0 filed Oct. 17, 2018, the disclosures of which are hereby incorporated by reference in their entirety.

BACKGROUND OF THE INVENTION

Field of the Invention

The present invention relates to a radar and light emission assembly, in particular for vehicles, equipped for emitting light and radar radiation, and equipped for detecting driving situations in a detection region by means of the radar radiation in particular for the purpose of support during the navigation of the vehicle. The invention also relates in particular to a method for emitting light and radar radiation and for detecting at least reflected radar radiation. Last but not least, the invention also relates to the use of the radar and light emission assembly.

Description of Related Art

In particular in the case of vehicle headlights, the attempt is already made to create a combined device with integrated functionality for lighting as well as for radar irradiation with a high practicality. Space requirement and robustness are thereby important demands when designing headlights, in particular for vehicles. A combined application of light and radar radiation has turned out to be advantageous, in particular when detecting relative positions in passenger transport. Today, driver assistance systems, such as adaptive distance regulations, lane departure warning systems, and emergency braking systems are used across all classes in many vehicles, in particular in passenger cars. However, such systems also provide advantages in the shipping or aviation industry and are already utilized or at least tested. The radar technology is at the forefront thereby, in particular for distance measurements. It is questionable, however, at which position on the vehicle the radar technology should be arranged in a meaningful manner and should possibly interact with further detection components. The conventional integration of the radar technology in the bumper of a road vehicle thereby bears a high risk of damage, in particular already in response to small collisions or only slight contacts of the vehicle with the surrounding area. In the case of an integration in the region of the radiator, compromises for the vehicle design have to be accepted, in turn. A further challenge for the integration of radar components in vehicles (in particular passenger cars), in particular in front ends, also lies in compensating attenuations of the transmitted and received signals at the individual material layers (in particular at the bumper) and at the lacquer layers. Artifacts and echo images in the radar signal have to usually be eliminated. In other words: Depending on the application, the exact evaluation of radar signals is not trivial.

As of late, attempts are thus made to integrate the radar technology in the headlight of a vehicle.

US 2008/0158045 A1 describes a vehicle headlight comprising a lighting unit and comprising a radar unit, which is integrated in the headlight and which comprises an antenna and a control unit, wherein the control unit is arranged below the lighting unit and below a light reflector, and is fastened to a base wall of the lamp housing, and wherein the antenna is fastened to the light reflector or is arranged in a region, which is encompasses or spanned by the light reflector, in particular in order to be able to ensure a good radiation efficiency.

US 2011/0279304 A1 describes a vehicle headlight comprising a lighting unit and a light reflector and comprising a projection lens and comprising a radar unit, which is integrated in the headlight and which comprises an antenna and a control unit, wherein the control unit and the antenna are arranged between the lighting unit and the projection lens, wherein the antenna is arranged in such a way that an optical interaction of the radar radiation with the projection lens is ensured, which projection lens is also arranged in optical interaction with the lighting unit and the light reflector.

Based on this prior art, there is interest in an assembly and a method for combined light and radar emission, with which further advantages can be attained and the use for the road user can be further increased.

SUMMARY OF THE INVENTION

The object is to provide a device and a method, with which the emission of light and radar radiation and the detection of reflected radiation by means of headlights can be optimized, in particular for vehicles or motor vehicles. The object in particular lies in realizing the emission of light and radar radiation and the detection of reflected radiation in such a way that the light as well as the radar radiation can be used in combination with one another in an integrated design in a common device for the navigation of a vehicle, in particular also in the case of advantageous side effects with regard to structural design and required space, or also with regard to the possible application spectrum, or also with regard to high reliability of the technology.

This object is solved by means of a radar and light emission assembly as well as by means of a method according to the present invention. The features of the exemplary embodiments, which will be described below, can be combined with one another, provided that this is not explicitly denied.

What is provided is a radar and light emission assembly, in particular for vehicle, equipped for emitting light and radar radiation and equipped for detecting at least reflected radar radiation, comprising: a headlight comprising a light-transparent headlight cover, and a light source arranged behind the headlight cover, thus in front of the headlight cover in the emission direction, and a light reflector; and comprising a radar module, which is arranged behind the headlight cover, integrated in the headlight and comprising a radar antenna unit. It is proposed according to the invention that the radar and light emission assembly has at least one radar radiation-forming mechanism, in particular comprising a frequency-selective radar radiation-forming mechanism, in particular comprising a radar radiation-forming mechanism, which is integrated in the headlight cover. This does not only provide an advantageous relative arrangement, but also a high variability with regard to the application of the radar radiation and in particular also a decoupling from the application of light radiation. In the case of advantageous integration in the headlight, the radar technology can thus be optimized with high degrees of freedom.

The radar module can thereby be arranged in particular in the emission direction between the headlight cover and the light source, wherein the headlight cover has a frequency-selective radar passage structure. It has been shown that an arrangement of the radar module as close to the front as possible in the emission direction x is advantageous, in particular close to the region of the headlight cover, in particular in overlapping arrangement with the headlight cover.

In contrast to technologies tested to date, the assembly according to the invention makes it possible to also utilize the advantages, such as, e.g., protection and integrated design within the headlight for the radar technology in a particularly flexible manner and with high variability, without thereby having to accept significant limitations with regard to the lighting function.

In the case of the assembly according to the invention, the headlight cover can moreover also be used as radiation dome or antenna dome, respectively. The headlight cover can consist in particular of plastics, such as, e.g., polycarbonate or glass. The headlight cover or the material thereof, respectively, is transparent (per se) for light and radar radiation (HF waves).

Radar is to thereby be understood as one of the already available or established technologies for transmitting and detecting electromagnetic waves in the radio frequency range, thus radar in the general meaning of "Radio Detection And Ranging" or "Radio Direction and Ranging". This radar technology can comprise, e.g., laser radar and/or millimeter wave radar.

According to one exemplary embodiment, the radar and light emission assembly comprises at least one component from the following group, which is in each case arranged in radar radiation-active interaction or in optical relation, respectively, or in emitted and/or reflected radar radiation-deflecting and/or filtering relation with the radar module in the emission direction between the headlight cover and the light source, or directly on the headlight cover (on the inside and/or outside): Radar reflector, at least one frequency-selective radar passage structure. This also provides advantages with regard to the relative arrangement of the components relative to one another in the headlight.

In the event that a projection lens is to be provided in the headlight (projection method instead of reflector method with light source), the arrangement of the radar module and of a/the radar reflector can be described analogously, thus with the projection lens analogously in the position of the light source described here. In other words: A reference to the light source can also be interpreted as a reference to a projection lens.

The headlight cover can thereby serve as main radiation dome for the radar system. The headlight cover can be made, e.g., of polycarbonate or glass. The headlight cover is preferably transparent for light as well as for HF waves. To minimize reflections in particular in the frequency range of 76 to 81 GHz, the thickness of the headlight cover can be selected as an integral multiple of half the wavelength.

Advantageous designs relating to the arrangement of the radar module will be described below.

According to one exemplary embodiment, the radar module is arranged outside of (in particular below or behind) a light cone, which is emitted by the light source. In other words: The radar module can be arranged outside of the light propagation region, thus laterally spaced apart from the optical axis of the light source(s). According to one exemplary embodiment, the radar module is arranged below a tangential plane or horizontal plane limiting the light reflector downwards. According to one exemplary embodiment, the radar module is arranged outside of (in particular below) an optical axis or an axis according to the main orientation of the light reflector or of the light source. This also makes it possible to optimize the relative arrangement to one another. A/the radar module can optionally be arranged behind the light source/sources, in particular in the case of an orientation of the optical axis of the radar module essentially parallel to (or in alignment with the) central longitudinal axis of a light cone of the light sources. A radar radiation-forming mechanism can thereby be arranged between the radar module and the light sources.

Radar emitters and receivers are not arranged in the beam path, but outside thereof, in particular below it. By reflection of the radar radiation at the reflector and by deflection of the radar radiation in the range of from 60 to 120°, in particular 90°, a diversion of the radar radiation in the direction of the vehicle front can take place in the case of advantageous relative arrangement of the individual components, and a beam formation can simultaneously be ensured as well.

The radar module or a radar emitter and receiver, respectively, can in particular be oriented vertically upwards. A transparent reflector (in particular so-called Fresnel Reflectarray) comprising a coating can be arranged in front thereof. The antennas used in the radar module are preferably planar antennas (e.g. patch/slot). The antennas can preferably be integrated in the radar module via transmission lines (e.g. microstrip lines) without additional adapters. The antennas can consist of several individual antennas or array antennas, in particular in two-dimensional arrangement.

The reflector is transparent for the light of the light source and only reflects the radar radiation and guides it forwards through the cover. The reflector thereby forms the radar radiation into a desired club shape or surface shape.

The cover can be coated in order to provide the frequency-selective passage structure and in order to only allow radar radiation within a certain bandwidth to pass.

According to one exemplary embodiment, the radar module is arranged in a region below the headlight cover in overlapping arrangement with the headlight cover. This also provides an advantageous decoupling from the lighting function. The headlight cover or the geometry thereof, respectively, can moreover also be used as radiation dome, so that a good efficiency and evaluation quality can be ensured.

According to one exemplary embodiment, the radar module is arranged on the base of a housing of the headlight, in particular in mechanical coupling to the base. This also promotes a decoupling from the lighting function.

According to one exemplary embodiment, an intermediate plane comprising a radiation-active cover is provided on the radar module or directly above the radar module, with the cover in particular designed as plastic layer, in particular polycarbonate layer, in particular comprising a coating on one side, which is opaque at least with respect to light. This also provides further degrees of freedom when setting the radiation characteristic. An advantageous arrangement for the radar module can be realized, in particular largely independently of the lighting function, in particular in the case of a cover designed as heat shield. In other words: The cover can be heat-insulating or heat-shielding or can have at least a corresponding heat-shielding layer.

According to one exemplary embodiment, the at least one radar radiation-forming mechanism is arranged in an emission direction of the radar radiation.

According to one exemplary embodiment, the at least one radar radiation-forming mechanism is arranged in the direction of reflection of the radar radiation.

According to one exemplary embodiment, the at least one radar radiation-forming mechanism is formed to be flat, in particular planar or curved.

According to one exemplary embodiment, the at least one radar radiation-forming mechanism is frequency-selective, in particular in that the radar radiation-forming mechanism comprises a frequency-selective radar passage structure. The radar radiation-forming mechanism is in particular designed to be frequency-selective in that the radar radiation-forming mechanism has dimensions, which are matched to the wavelength of the emitted radar radiation (frequencies).

According to one exemplary embodiment, the at least one radar radiation-forming mechanism is arranged in the emission direction of the light source.

According to one exemplary embodiment, at least two radar radiation-forming regions, each comprising an individual radar radiation-forming function, are provided at the at least one radar radiation-forming mechanism. It is also possible thereby to individually influence a first portion of the radar radiation, and to individually influence a second portion of the radar radiation in a different way than the first portion, in particular for the purpose of an optimized detection in close-up and far regions and/or in front and side regions.

According to one exemplary embodiment, the at least two radar radiation-forming regions are arranged/formed in the same radar radiation-forming mechanism. This also provides an extensive functional integration.

The different radar radiation-forming regions can in particular comprise at least one electrically conductive region and at least one electrically non-conductive region.

The radar radiation forms in particular a radiation front, which can be reflected by means of the assembly according to the invention, in particular in the electrically conductive regions, so that an interference pattern can be predefined.

Advantageous designs relating to the orientation of the radar module or relating to the arrangement of the radar module relative to further components will be described below.

According to one exemplary embodiment, an optical axis of the radar module or of the radar antenna unit is oriented at least approximately vertically upwards (vertically) in proper arrangement of the headlight. According to one exemplary embodiment, the optical axis of the radar module or of the radar antenna unit is directed at a radar reflector, which is arranged behind the headlight cover, integrated in the headlight and behind the light source in the emission direction, wherein the optical axis of the radar module is oriented towards the radar reflector in such a way that the radar module can be arranged on the base of the headlight. This also provides a local decoupling of the radar module from the light propagation path in each case.

The relative placement of the integrated antenna and radar module remains comparatively flexible, in particular because it is sealed off from the outer side of the headlight. The relative placement described here has turned out to be particularly advantageous.

Advantageous embodiments relating to the radar antenna unit will be described below.

According to one exemplary embodiment, a/the radar antenna unit is arranged at/on an upper side of the radar module. This relative arrangement is also advantageous with regard to a decoupling from the light propagation path.

According to one exemplary embodiment, the radar antenna unit is designed as planar antenna (in particular in the manner of a patch and/or slot antenna). This facilitates the integration, in particular in the case of the assembly according to the invention.

According to one exemplary embodiment, the radar antenna unit has a plurality of individual antennas or antenna arrays in two-dimensional arrangement. This promotes high variability when setting the radiation characteristic.

According to one exemplary embodiment, the radar antenna unit is integrated in the radar module by means of microstrip lines without additional adapters. This also facilitates the integration.

The radar module can in particular include all those HF front ends and electronic components and circuits, which can be produced on planar dielectric substrates. In an advantageous manner, all of the antennas are located at the foot (base) of the headlight housing in the vicinity of the headlight cover, in particular arranged so as to be at least partially overlapped by the headlight cover.

A radiation-active cover is arranged in an intermediate plane between the radar reflector and the radar module, in particular in a direction/plane at least approximately orthogonal to the optical axis of the radar module, in particular in order to optically seal off the radar module. In an advantageous manner, the cover consists of flat, thin plastic (in particular of polycarbonate), wherein the plastic can be coated darkly on one side. The cover is preferably arranged and equipped for the purpose of acting as heat shield for electronic components. This arrangement of the cover also provides a slim structural setup.

Advantageous embodiments relating to a radar reflector of the assembly according to the invention will be described below.

According to one exemplary embodiment, the radar and light emission assembly has a radar reflector, which is arranged behind the headlight cover, integrated in the headlight, wherein the radar module is arranged below the radar reflector.

According to one exemplary embodiment, the radar reflector is arranged in an arrangement, which covers or overlaps the radar module, in particular in such a way that the radar module is completely covered solely by the radar reflector or together with the headlight cover in top view against the optical axis of the radar module.

According to one exemplary embodiment, the radar reflector, together with the radar module, is at least approximately arranged in the same longitudinal position, in particular completely overlapped or covered by the headlight cover, in particular in a last third of the longitudinal extension of the radar and light emission assembly to the headlight cover in the emission direction. According to one exemplary embodiment, the radar reflector is arranged below an optical axis or below an axis according to the main orientation of the light reflector or of the light source. This also provides an advantageous relative arrangement of the components to one another in each case.

In other words: In the assembly according to the invention, a radar reflector and optionally also a high-frequency lens in the region of the headlight cover can adapt the radar radiation in a particularly flexible manner (thus at a high variability) according to the respective situation, in particular largely decoupled from the lighting function. If the radar system is integrated in a motor vehicle front headlight, the radar signal thereof can be tailored to the desired detection region, in particular by means of at least one structured conductive layer/surface (radar passage structure in particular with patterns in terms of small functional structures) in the headlight cover. Moreover, the headlight of a motor vehicle can also take over a protective function for the radar technology, in particular due to the headlight cover.

According to one exemplary embodiment, the beam path of the radar radiation is deflected in the range of from 70 to 110°, in particular in the range of 90°, by means of the radar reflector, in particular oriented at least approximately in the emission direction of the radar and light emission assembly. This also provides advantages with regard to the relative arrangement of the components to one another.

According to one exemplary embodiment, the radar reflector has a two-dimensional extension. This can also make the setup in in a maximally simple and robust manner.

According to one exemplary embodiment, the radar reflector, in particular the inner side thereof, is arranged with an incline in the range of from 35 to 60°, in particular 40 to 50°, relative to the emission direction x or relative to the horizontal, at least in some sections. According to one exemplary embodiment, the radar reflector is arranged relative to the headlight cover in such a way that the radar reflector and the headlight cover form a roof structure, which covers the radar module, with the geometry of a saddle roof comprising two surface areas, which are oppositely inclined, in particular with an included angle in the range of from 45 to 90°. This also provides an advantageous relative arrangement and can facilitate the functional integration in each case.

According to one exemplary embodiment, the arrangement and/or orientation of the radar reflector can be adjusted by means of a motor. This also provides a large variability and can widen the functional scope.

According to one exemplary embodiment, the radar reflector has a three-dimensional extension at least in some sections and is equipped for also laterally reflecting radar radiation. Last but not least, this also widens the functionality. A high/wide functionality can in particular also be ensured for a small installation space with simple means.

According to one exemplary embodiment, the radar reflector is formed from a plurality of two-dimensional elements and thus has a two-dimensional extension for each element or a two-dimensional or three-dimension extension with respect to all elements. This also provides a high variability.

According to one exemplary embodiment, the radar reflector is formed as Fresnel reflector, whereby both sides of the radar reflector have a frequency-selective radar passage structure, and wherein the radar reflector is equipped for focusing and/or collimating the radar radiation. This provides a highly targeted influence on the radiation characteristic.

According to one exemplary embodiment, the radar reflector consists of light- and radar radiation-transparent substrate material and has a radar radiation-forming mechanism, in particular designed as coating or as electrically conductive surface, in particular with frequency-selective radar passage structure. This can also ensure a particularly simple and robust setup. The electrically conductive layer or surface can in particular be made of copper, independently of the arrangement thereof.

According to one exemplary embodiment, the radar reflector has a radar radiation-forming mechanism and is arranged relative to the headlight cover in such a way that the radar radiation passes/irradiates through a/the respective frequency-selective radar passage structure at least twice from the radar module to outside of the headlight cover. This also provides a high variability. In other words: The radar radiation can be guided via a first filter (first radar passage structure) provided by the radar reflector, and after deflection, also via a second filter (second or further radar passage structure) provided by the headlight cover.

According to one exemplary embodiment, the radar reflector is formed from individual reflector elements, which are each rectangular or triangular, in particular with the same side length. This provides a type of modular setup for high variability, in particular with a simple basic setup of each individual reflector element.

According to one exemplary embodiment, the radar reflector has, on at least one of its surfaces, a light-transparent, electrically conductive oxide layer or an electrically conductive surface. This provides good reflectivity. The radar passage structure can thereby be at least partially provided by means of the oxide layer. In addition to a comparatively high variability (key word: influencing the manner of the radiation propagation), this type of integration of the radar passage structure also provides advantages with regard to space requirement.

According to one exemplary embodiment, the radar reflector is light-transparent (transparent for light or visible radiation, respectively), and radar radiation-opaque (reflective for radar or HF waves, respectively). This also provides a good variability with regard to an arrangement relative to the light source.

According to one exemplary embodiment, the radar reflector is set up to form the radar radiation, in particular in club shape or surface shape. This widens the application options.

The radar reflector is set up to divert and/or collimate the arriving HF waves. The necessity of adapting the HF wave impedance can be eliminated with the use of a reflector instead of a lens.

The radar reflector can be referred to as radar radiation-selective intermediate structure between the radar module or a radar antenna, respectively, and the HF wave in the room. The reflector can have the following shapes:

Planar reflector: The reflector is set up to reflect the radiation of the antenna according to Snell's law.

Shaped reflector: The radiation is reflected and scattered as a function of the 3D shape of the reflector, in particular also in the lateral direction. An increase or decrease of the EM wave intensity (directional effect of the radiation behavior) can be set or specified, respectively, by suitable shaping of the reflector.

Fresnel reflector: The radiation is collimated and/or focused. The reflector collimates the wave or sets the HF wave components in the correct phase. The reflector is in particular set up to convert spherical waves into planar waves.

The thickness of a substrate of the reflector is thereby advantageously an odd multiple of the wavelength. This promotes a conversion into planar waves.

The radar reflector can thereby consist of substrate material, which is transparent not only for the light, but also for the HF waves. The reflectivity can in particular be set or specified, respectively, in that one or two sides of the substrate are coated with a very thin, transparent, conductive oxide (TCO).

In the case of the Fresnel reflector, two surface areas are preferably provided, which are coated by means of the TCO. In the case of the planar or shaped reflector, only one TCO-coated surface area is preferably provided.

The radar reflector is preferably arranged in the vicinity of the headlight housing, considerably in front of the light source. The arrangement between the headlight cover and the projection lens (in the case of headlights with projection method) or between the headlight cover and the light source (in the case of headlights with reflector method) is preferred.

The radar reflector is inclined such or is oriented in such a way, respectively, that the transmitting HF waves can correctly illuminate the provided objects and that the reception waves can be focused on the receiving antenna.

Advantageous designs relating to the at least one radar radiation-forming mechanism comprising a frequency-selective radar passage structure will be described below.

According to one exemplary embodiment, a or the respective radar radiation-forming mechanism, respectively, comprising a frequency-selective radar passage structure has a periodic arrangement of structure patterns at least in some sections, with the structure patterns being in particular in concentric arrangement. This also makes it possible in a particularly flexible manner to design and to optimize the assembly according to the invention with regard to individual applications.

According to one exemplary embodiment, the radar radiation-forming mechanism comprising a frequency-selective radar structure is formed as coating or as film or as electrically conductive surface. This can further simplify the structural setup. A coating can in particular also be provided in addition to integrated patterns or structures, respectively.

According to one exemplary embodiment, the headlight cover forms a substrate for the radar radiation-forming mechanism or for the frequency-selective radar radiation passage structure, respectively. This provides a particularly robust setup, in particular in the manner of a base module, which can be used and further adapted for various applications.

According to one exemplary embodiment, the radar radiation-forming mechanism has a conductive part, which is designed as light-transparent, electrically conductive oxide layer. This also provides an optimization of the reflection properties.

The radar passage structure can have a periodic arrangement of patterns (key word: unit cell), which are set up to filter over the provided frequency band, e.g. bandpass filter at 76 GHz to 81 GHz.

The radar passage structure can also be integrated in the headlight cover, wherein the headlight cover serves as substrate for the radar passage structure. A conductive part of the radar passage structure thereby preferably consists of ultra-thin, transparent, conductive oxide or a corresponding oxide layer (TCO), respectively. The radar passage structure can thereby fulfill at least two functions, independently of the arrangement on the reflector and/or on the headlight cover:

filtering undesired HF waves outside of the provided band (e.g. 76 to 81 GHz); and specifying the radiation characteristic of the desired HF waves (in particular emission direction, manner and extent of a collimation and/or of a scattering).

The radar passage structure can have different designs, which are not only limited to simple geometries (e.g. complementary loop, cross, strips), but can also include, e.g., more complex meander-based slots (in particular for the bandpass), in particular to reduce the size of the unit cell and to attain an improved angular stability.

The passage structures can be equipped for bundling, diverting, and/or filtering the radar waves, so that different scanning regions, ranges, and deflection angles can be realized.

Advantageous designs relating to the headlight cover will be described below.

According to one exemplary embodiment, the headlight cover consists of light and radar radiation-transparent material, in particular of substrate material for the frequency-selective radar passage structure designed as integrated coated. This provides an even more extensive functional integration, in particular in the case of a robust embodiment.

According to one exemplary embodiment, the headlight cover has a thickness according to an integral multiple of half the wavelength of the emitted radar radiation. This also makes it possible to optimize the transmission properties.

According to one exemplary embodiment, a frequency-selective radar passage structure is provided on both sides (on the inside and outside) of the headlight cover. This promotes a particularly targeted influence on the radiation characteristic.

According to one exemplary embodiment, the radar and light emission assembly is designed without projection lens, in that the radar beam path runs from the radar module over the radar reflector and the headlight cover, and in that the light propagation path runs from the light source and the light reflector directly over the headlight cover, thus in each case without further intermediary optical or radiation-active components.

In other words: The entire assembly is without projection lens, thus lens-free. Last but not least, this also provides a simple, compact, robust setup.

According to one exemplary embodiment, the headlight cover is arranged relative to the radar module in such a way that the headlight cover forms a radiation dome for the radar module. This can further optimize the functional integration in the headlight, in particular also with regard to sensitivity and/or accuracy of the evaluation.

An exemplary functional description is provided below.

A selective scanning of the situation of the surrounding area can be realized by means of the assembly according to the invention via a transmitting and receiving array, in the case of which not only the region up front (frontal), but optionally also the side region (lateral) can be covered. The number of the required sensor systems can thereby also be reduced in the headlight. A significantly improved resolution can also be realized. In particular in the case of laser-based structuring of thin layers, a desired radiation shaping can be realized in a flexible manner, so that the adaptation of the radar properties to the respective headlight type and to the desired scanning region in the close-up and far field can be optimized.

It has been shown that transparent plastic substrates can be coated with transparent, yet electrically conductive layers, which layers can be locally removed subsequently. A laser method for the thin layer removal can in particular also be applied for the production of the structures, which can be individually designed for a respective application, with the advantage or a largely residue-free removal without damaging the substrate and without optical disadvantages.

The application of the radar passage structure can optionally take place in a lithographic manner and/or by means of masked coating as well as printing.

The above-mentioned object is in particular also solved by means of a radar and light emission assembly, in particular for vehicles, equipped for emitting light and radar radiation and equipped for detecting at least reflected radar radiation, comprising: a headlight comprising a light-transparent headlight cover and a light source arranged behind the headlight cover, and a light reflector;

a radar module, which is arranged behind the headlight cover, integrated in the headlight and comprising a radar antenna unit; wherein the radar module is arranged between the headlight cover and the light source in the emission direction x, wherein the headlight cover has a frequency-selective radar passage structure, wherein the radar module is arranged below an optical axis or an axis according to the main orientation of the light reflector or the light source, wherein the radar module is arranged in a region below the headlight cover in overlapping arrangement with the headlight cover, wherein an optical axis of the radar module or of the radar antenna unit is oriented at least approximately vertically upwards in proper arrangement of the headlight, wherein the radar and light emission assembly has a radar reflector, which is arranged behind the headlight cover, integrated in the headlight, wherein the radar module is arranged below the radar reflector, wherein the radar reflector is arranged below the optical axis or an axis according to the main orientation of the light reflector or of the light source, wherein a/the beam path of the radar radiation is deflected in the range of from 70 to 110°, in particular in the range of 90°, by means of the radar reflector, is in particular oriented at least approximately in the emission direction x of the radar and light emission assembly, and wherein the radar reflector, in particular the inner side thereof, is arranged with an incline in the range of from 35 to 60°, in particular 40 to 50°, relative to the emission direction x or relative to the horizontal, at least in some sections. This results in numerous above-mentioned advantages.

The above-mentioned object is also solved by means of the use of a radar and light emission assembly, in particular of an above-described radar and light emission assembly, for emitting light and for the frequency-selective emission of radar radiation and for specifying a radar detection region by means of at least one, in particular by means of at least two radar radiation-forming mechanisms, in particular frequency-selective radar passage structures, which mechanisms is/are at least also provided in or on at least one side of a light-transparent headlight cover of the radar and light emission assembly, in particular in the beam path, starting at a radar module in series one behind the other in at least two positions comprising a position outside of the light cone of the light source (e.g. at a radar reflector arranged above the radar module), in particular in a headlight of a vehicle, in particular in a headlight of an automobile, wherein a radar module of the radar and light emission assembly is arranged outside of a light cone emitted by the light source, in particular below the at least one, in particular below the at least two radar radiation-forming mechanisms, comprising an optical axis of the radar module oriented upwards, in particular at least approximately orthogonally to the optical axis of a light source of the headlight. Above-mentioned advantages result from this. The vehicle can be an automobile (motor vehicle for the road) or an aircraft or a watercraft.

The above-mentioned object is also solved by means of a radar and light emission assembly for vehicles and equipped for emitting light and radar radiation and equipped for detecting at least reflected radar radiation, comprising a headlight comprising a light-transparent headlight cover, and a light source arranged behind the headlight cover, and a light reflector, and comprising a radar module arranged behind the headlight cover, integrated in the headlight, comprising a radar antenna unit, in particular by means of an above-described radar and light emission assembly, produced by forming at least one radar radiation-forming mechanism, in particular designed as frequency-selective radar passage structure, at least also on or in the headlight cover (optionally used/serving as substrate), wherein the radar radiation-forming mechanism has a conductive part designed as light-transparent, electrically conductive oxide layer, or is at least partially formed thereby, and wherein a structure pattern is introduced into the radar radiation-forming mechanism by means of thin layer removal, in particular by means of laser. Above-mentioned advantages result from this. It has been shown that structures introduced by means of laser make it possible in a particularly exact manner to control or set, respectively, and specify direction and radiation characteristic of the radar radiation.

The above-mentioned object is also solved by means of a method for emitting light and radar radiation and for detecting at least reflected radar radiation in each case by means of a radar and light emission assembly, in particular by means of an above-described radar and light emission assembly, in particular in a vehicle, wherein light from a light source of a headlight is emitted through a light-transparent headlight cover according to the direction of an optical axis of the light source, and wherein radar radiation is emitted by a radar module arranged behind the headlight cover, integrated in the headlight; wherein the radar radiation is emitted by the radar module in a direction transversely, in particular approximately orthogonally, to the optical axis of the light source, and is deflected in at least one emission direction of the radar and light emission assembly via at least one radar radiation-forming mechanism, which is at least also provided on or in the headlight cover, in particular designed as frequency-selective radar passage structure, in particular at least approximately parallel to the optical axis of the light source, in particular in the driving direction of a vehicle, which orients the headlight, wherein the radiation characteristic of the radar radiation is specified by means of the at least one radar radiation-forming mechanism. Above-mentioned advantages result from this.

According to one embodiment, the method comprises the emitting of the radar radiation over at least two frequency-selective radar passage structures, which are arranged in the beam path, starting at the radar module in series one behind the other in at least two positions, wherein the positions comprise: One position at a radar reflector arranged outside of the light cone of the light source (for example above the radar module), and one position on or in the headlight cover; wherein the optical axis of the radar module is oriented in particular at least approximately orthogonally to the optical axis of a light source of the headlight. This also provides an optimization of the radiation characteristic in a particularly variable or exact manner. The respective radar passage structure can thereby optionally have a structure pattern comprising a plurality of different structures. This widens the influence options in the manner of the radiation emission.

According to one embodiment, the method also comprises a detection of reflected radar radiation, wherein the reflected radar radiation is detected in particular on opposite beam path. This also widens the functional scope.

According to one embodiment, a structure pattern is introduced into the radar radiation-forming mechanism by means of thin layer removal or thin layer application. This can take place, for example, by means of laser removal, by means of a film, by means of a printing, coating, or vapor deposition method, respectively (sputtering, thermal evaporation, and/or electron beam evaporation), and/or by means of lithography.

According to one embodiment, the radar radiation-forming mechanism is produced by means of thin layer removal or by means of thin layer application or by applying a film.

BRIEF DESCRIPTION OF THE DRAWINGS

The invention will be described in more detail in the following drawing figures, wherein for reference numerals, which are not explicitly described in a respective drawing figure, reference is made to the other drawing figures, in which.

DESCRIPTION OF THE INVENTION

Figure 1:
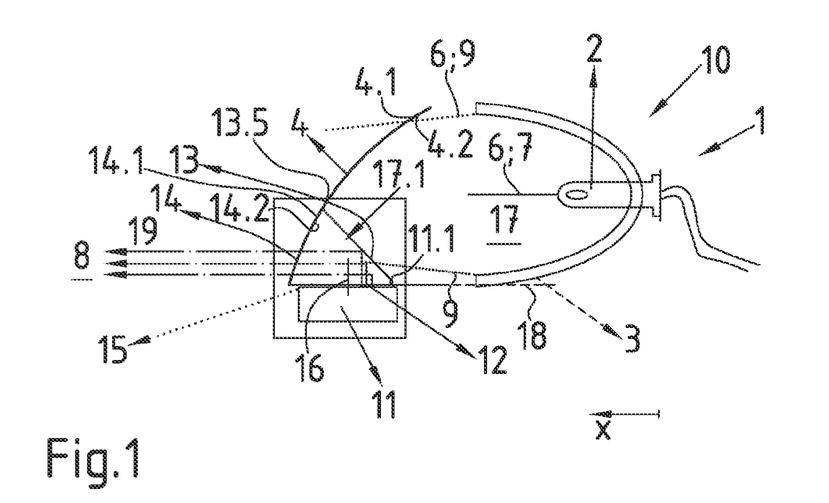
FIG. 1 shows a radar and light emission assembly according to an exemplary embodiment in a side view in schematic illustration.

A headlight 1 is shown in FIG. 1, which has a light source 2 (optionally also projections lens), and a light reflector 3, and a light-transparent headlight cover 4 comprising an outer surface 4.1 and an inner surface 4.2. The light source 2 and the light reflector 3 are oriented in such a way according to an optical axis 7 (main orientation) that the light is emitted in a light cone 9 through the headlight cover 4. This results in a light propagation path 6, which, starting from the light source 2, runs frontally to the front and which is laterally limited by the specifications of the light reflector. According to one option, the light propagation path 6 is a light cone.

A radar module 11 is integrated in the headlight 1, so that a radar and light emission assembly 10 is formed. At least one radar antenna unit 12 (transmitting and receiving unit) is provided on the upper side 11.1 of the radar module 11. A radar reflector 13 is arranged above the radar module 11. The headlight cover 4 has at least one light-transparent, frequency-selective radar passage structure 14, in particular designed as coating. An external radar passage structure 14.1 and/or an internal radar passage structure 14.2 can in particular be provided.

An intermediate plane 15 comprising radiation-active cover is provided between the radar module 11 and the radar reflector 13. The intermediate plane 15 or the cover, respectively, at least approximately coincides with a plane 18 (tangential plane), which is tangent to the light reflector 3 on the bottom, and/or is oriented at least approximately parallel thereto. The optical axis 16 of the radar module or of the respective antenna unit 12 is oriented at least approximately orthogonally to the intermediate plane 15, and/or is oriented at least approximately vertically.

A headlight cavity 17, which is spanned by the headlight cover and optionally also spanned by the light reflector, serves to receive all radar technology components. The radar module 12, together with the antenna unit 13, is thereby arranged in a partial cavity 17.1 (in particular in the form of a saddle roof), which is roofed by the headlight cover and the radar reflector, in a region in the very front of the headlight cavity 17 adjacent to the headlight cover 4. Frontally, the partial cavity 17.1 is limited by the headlight cover 4, and at the aft (rear), the partial cavity 17.1 is limited by the radar reflector 11.

In a contact point or a fastening point 13.5 of the radar reflector for contact with the headlight cover, an angle is formed between the headlight cover and the radar reflector, which angle lies in particular in the range of from 45 to 90°, for example approx. 55 to 60°. This contact angle can also be described as roof angle between two oppositely inclined (roof) surface areas, in particular with reference to a saddle roof construction. Further contact points with further angles can also be formed between the headlight cover and the radar reflector, in particular in the case of optionally three-dimensional extension of the radar reflector also at the intersection to the headlight cover.

The beam path 19 of the radar radiation or HF wave, respectively, which is emitted by the radar module 12 and which propagates, initially runs transversely to the emission direction x, in particular at least approximately orthogonally thereto and/or at least approximately in the vertical direction, and is then deflected by approx. 90° by means of the radar reflector 13, whereby a detection region 8 is defined by means of the radar reflector and/or by means of a respective radar passage structure 13, 14. It follows from FIG. 2 that the detection region can optionally or additionally, respectively, also be arranged laterally, in particular in the case of a radar reflector comprising a three-dimensional extension.

The arrow x in FIG. 1 indicates the emission direction or the corresponding longitudinal position of a respective component in the emission direction, respectively, whereby the respective longitudinal position is detected, for example, starting at the light source. The radar module and the radar reflector and optionally also the antenna unit are arranged in at least approximately the same longitudinal position x. The headlight cover 4 extends aftwards (to the rear) into a longitudinal position smaller than the longitudinal position of the radar module and of the radar reflector. In other words: The headlight cover does not only overlap the radar module and the radar reflector, but covers these two components completely in the emission direction.

Figure 2:
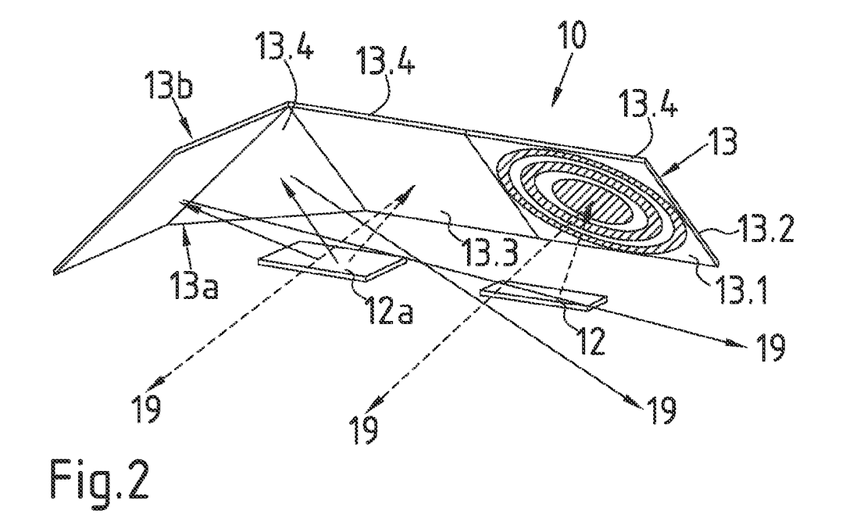
FIG. 2 shows a radar reflector and radar antenna units of a radar and light emission assembly according to an exemplary embodiment in a perspective view in schematic illustration.

A radar and light emission assembly 10 is shown in FIG. 2, which has a plurality of radar reflectors and a plurality of radar antenna units 12, 12a, namely also at least one radar antenna unit 12a for obliquely oriented radiation, and which is equipped for the lateral detection. In addition to the radar reflector 13 already described above, a radar reflector 13a, which is equipped for oblique irradiation, as well as a radar reflector 13b, which is equipped for lateral irradiation (side view) is also provided. Together, all three types of radar reflectors can be provided in a module-like manner as uniform radar reflector, in particular in that each radar reflector is provided as reflector element 13.4 comprising a two-dimensional extension. Each reflector element 13.4 can be characterized by at least one of the following components: first (in particular on one side) frequency-selective structure 13.1 (radar passage structure), second (in particular applied on one side) frequency-selective structure 13.2, each in particular introduced as coating or integrated in the material; and/or light-transparent, electrically conductive oxide layer (TCO) 13.3 optionally on one side or on both sides. Only a single frequency-selective structure is optionally provided, in particular integrated in the material of the respective reflector element 13.4. In the alternative or in addition, the TCO layer 13.3 can optionally also be formed at the headlight cover 4.

Figure 3:
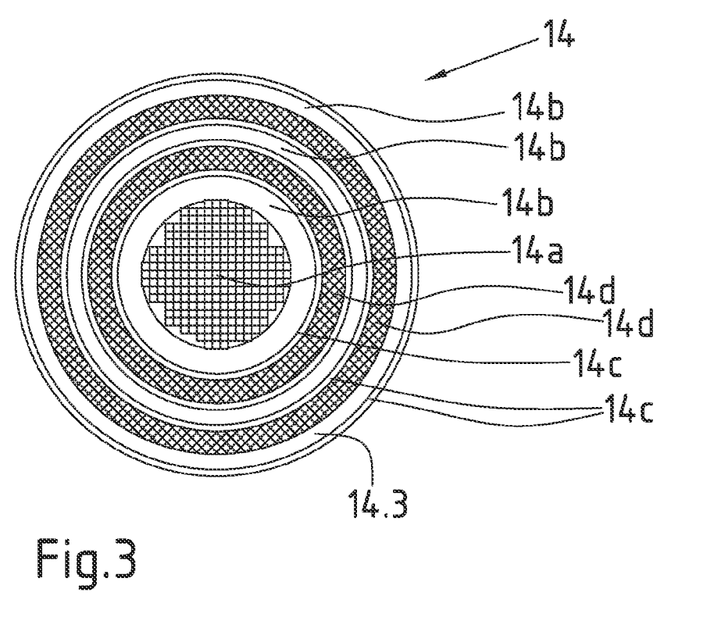
FIG. 3 shows a radar passage structure of a radar and light emission assembly according to an exemplary embodiment in a top view in schematic illustration.

An individual exemplary embodiment for a radar passage structure 14 is shown in detail in FIG. 3. The radar passage structure 14 is formed by a system of at least four types of structures, in particular a first frequency-selective radar passage structure 14a, in particular so-called bandpass structure, and a second frequency-selective radar passage structure 14b, in particular so-called Fresnel region, and a third frequency-selective radar passage structure 14c, in particular so-called PRS (partially reflective structure), and a fourth frequency-selective radar passage structure 14d, in particular so-called lowpass structure. The respective structure can be introduced or integrated, respectively, in particular by means of a laser method. In the case of an individual or in the case of every radar passage structure, one or several transparent, electrically conductive oxide layers (TCO) 14.3 can optionally be provided, in particular for the purpose of optimizing the reflection properties.

Figure 4:
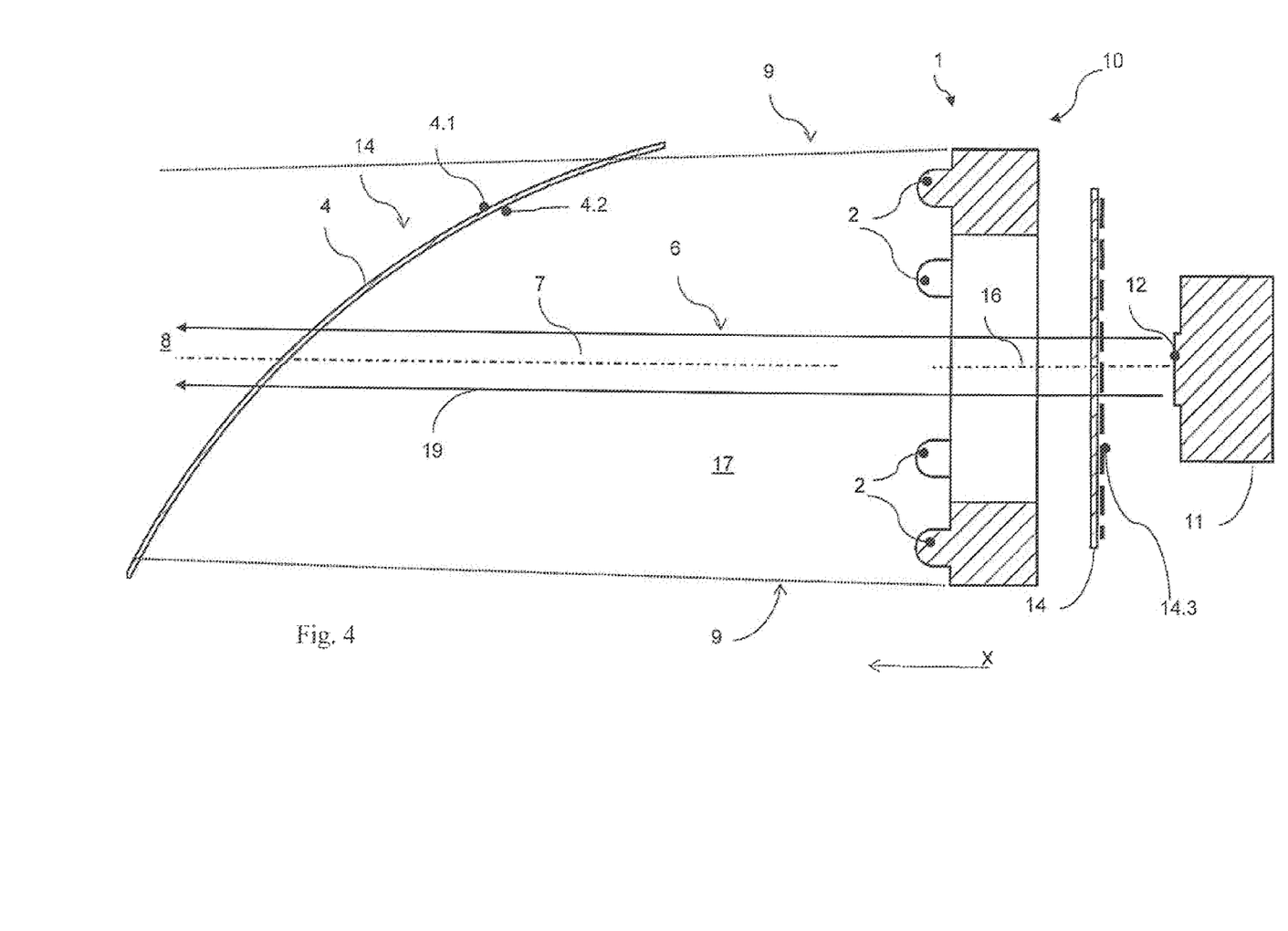
FIG. 4 shows a radar and light emission assembly according to an exemplary embodiment in a side view in schematic illustration.

An exemplary embodiment for a further radar and light emission assembly 10 is shown in FIG. 4, which is integrated in a headlight 1. The radar module 11 is arranged behind several light sources 2. The optical axes 7 and 16 are located one on top of the other or are oriented at least approximately parallel to one another. The light sources 2 surround the optical axis 16 of the antenna unit 12 or are arranged at least partially circumferentially around it. Between the light sources 2 and the detection region 8, (only) the light-transparent, radar radiation-forming headlight cover is arranged. A radar radiation-forming mechanism 14 with TCO layer 14.3, which does not necessarily have to be light-transparent in the assembly according to FIG. 4, is arranged between the antenna unit 12 and the light sources.

LIST OF REFERENCE NUMERALS 1 headlight
2 light source or projection lens
3 light reflector
4 headlight cover, in particular designed as or with light-transparent radar radiation-forming mechanism
4.1 outer surface
4.2 inner surface
6 light propagation path
7 optical axis of the light source or of the light reflector (main orientation)
8 detection region
9 light cone
10 radar and light emission assembly
11 radar module
11.1 upper side
12 radar antenna unit (transmission and receiving unit)
12a radar antenna unit for obliquely oriented radiation
13 light-transparent radar radiation-forming mechanism, in particular radar reflector
13.1 first frequency-selective structure, in particular coating or integrated
13.2 second frequency-selective structure, in particular coating or integrated
13a radar reflector or radar reflector element, respectively, for oblique irradiation
13b radar reflector or radar reflector element, respectively, for lateral irradiation (side view)
13.3 light-transparent, electrically conductive oxide layer (TCO)
13.4 reflector element, in particular with two-dimensional extension
13.5 contact point or fastening point for headlight cover
14 light-transparent radar radiation-forming mechanism, in particular frequency-selective radar passage structure, in particular designed as coating and/or introduced so as to be integrated in the material
14.1 external radar passage structure, in particular as outer coating
14.2 internal radar passage structure, in particular as inner coating
14.3 transparent, electrically conductive oxide layer (TCO)
14a first frequency-selective radar passage structure, in particular bandpass
14b second frequency-selective radar passage structure, in particular Fresnel region
14c third frequency-selective radar passage structure, in particular PRS
14d fourth frequency-selective radar passage structure, in particular lowpass
15 intermediate plane with radiation-active cover
16 optical axis of the radar module or of the antenna unit
17 headlight cavity, spanned by the headlight cover and optionally also spanned by the light reflector
17.1 roofed partial cavity
18 tangential plane, in particular oriented as horizontal plane
19 beam path (emitted, propagating radar radiation or HF wave, respectively)
x emission direction or longitudinal position, respectively

The invention claimed is:

1. A radar and light emitting assembly for vehicles equipped for emitting light and radar radiation and equipped for detecting at least reflected radar radiation, said assembly comprising:
   a headlight comprising a light-transparent headlight cover and a light source arranged behind the headlight cover, and a light reflector; and
   a radar module, which is arranged behind the headlight cover, integrated in the headlight and comprising a radar antenna unit;
   wherein the radar and light emission assembly has at least one radar radiation-forming mechanism;
   wherein the at least one radar radiation-forming mechanism is arranged in the emission direction of the radar radiation, namely in the emission direction of the radar and light emission assembly; and
   wherein at least one of the at least one radar radiation-forming mechanism is formed at least also on or in the headlight cover.

2. The radar and light emission assembly according to claim 1, wherein the at least one radar radiation-forming mechanism is arranged in the direction of reflection of the radar radiation.

3. The radar and light emission assembly according to claim 1, wherein the at least one radar radiation-forming mechanism is formed to be extensive, specifically planar or curved.

4. The radar and light emission assembly according to claim 1, wherein the at least one radar radiation-forming mechanism is frequency-selective in that the radar radiation-forming mechanism comprises a frequency-selective radar passage structure; or wherein the at least one radar radiation-forming mechanism is arranged in the emission direction of the light source.

5. The radar and light emission assembly according to claim 1, wherein at least two radar radiation-forming regions, each comprising an individual radar radiation-forming function, are provided at the at least one radar radiation-forming mechanism.

6. The radar and light emission assembly according to claim 5, wherein the at least two radar radiation-forming regions are arranged in the same radar radiation-forming mechanism.

7. The radar and light emission assembly according to claim 1, wherein the radar and light emission assembly has a radar reflector, which is arranged behind the headlight cover, integrated in the headlight, and wherein the radar module is arranged below the radar reflector; or wherein the radar reflector, together with the radar module, is at least approximately arranged in the same longitudinal position, specifically completely overlapped or covered by the headlight cover, specifically in a last third of the longitudinal extension of the radar and light emission assembly to the headlight cover in the emission direction; or wherein the radar reflector is arranged below an optical axis or an axis according to the main orientation of the light reflector or of the light source; or wherein a/the beam path of the radar radiation is deflected in the range of from 70 to 110°, by means of the radar reflector, is oriented at least approximately in the emission direction of the radar and light emission assembly; or wherein the inner side of the radar reflector is arranged with an incline in the range of from 35 to 60°, relative to the emission direction or relative to the horizontal, at least in some sections; or wherein the radar reflector is arranged relative to the headlight cover in such a way that the radar reflector and the headlight cover form a roof structure, which covers the radar module, with the geometry of a saddle roof comprising two surface areas, which are oppositely inclined with an included angle in the range of from 45 to 90°; or wherein the arrangement orientation of the radar reflector can be adjusted by means of a motor; or wherein the radar reflector has a three-dimensional extension at least in some sections and is equipped for also laterally reflecting radar radiation; or wherein the radar reflector consists of light- and radar radiation-transparent substrate material and has a further radar radiation-forming mechanism designed as coating or as electrically conductive surface; or wherein the radar reflector has a further radar radiation-forming mechanism and is arranged relative to the headlight cover in such a way that the radar radiation irradiates through a frequency-selective radar passage structure at least twice from the radar module to outside of the headlight cover; or wherein the radar reflector has, on at least one of its surfaces, a light-transparent, electrically conductive oxide layer or an electrically conductive surface.

8. The radar and light emission assembly according to claim 1, wherein the radar radiation-forming mechanism has a periodic arrangement of structure patterns at least in some sections, with the structure patterns being in concentric arrangement; or wherein the radar radiation-forming mechanism is formed as a coating or as a film or as an electrically conductive surface; or wherein the headlight cover forms a substrate for the radar radiation-forming mechanism; or wherein the radar radiation-forming mechanism has a conductive part, which is designed as light-transparent, electrically conductive oxide layer.

9. A method for emitting light and for the frequency-selective emission of radar radiation and for specifying a radar detection region by means of at least one radar radiation-forming mechanisms which mechanism is at least also provided in or on at least one side of a light-transparent headlight cover of the radar and light emission assembly, in the beam path in the emission direction of the radar radiation, namely in the emission direction of the radar and light emission assembly, starting at a radar module in series one behind the other in at least two positions comprising a position at a radar reflector arranged outside of the light cone of the light source, in a headlight of a vehicle, wherein the radar module is arranged outside of a light cone emitted by the light source below the at least one radar radiation-forming mechanisms, comprising an optical axis of the radar module oriented upwards at least approximately orthogonally to the optical axis of a light source of the headlight, wherein at least one of the at least one radar radiation-forming mechanism is formed at least also on or in the headlight cover.

10. A radar and light emission assembly according to claim 1, produced by forming at least one radar radiation-forming mechanism at least also on or in the headlight cover, wherein the radar radiation-forming mechanism has a conductive part designed as light-transparent, electrically conductive oxide layer, or is at least partially formed thereby, and wherein a structure pattern is introduced into the radar radiation-forming mechanism by means of thin layer removal.

11. The radar and light emission assembly according to claim 10, wherein the radar radiation-forming mechanism is designed as a frequency-selective radar passage structure, wherein a structure pattern is introduced into the radar radiation-forming mechanism by means of thin layer removal or thin layer application, or wherein the radar radiation-forming mechanism is produced by means of thin layer removal or by means of thin layer application or by applying a film.

12. The radar and light emission assembly according to claim 3, wherein the at least one radar radiation-forming mechanism is formed to be extensive, specifically planar or curved.

13. The radar and light emission assembly according to claim 2, wherein the at least one radar radiation-forming mechanism is frequency-selective in that the radar radiation-forming mechanism comprises a frequency-selective radar passage structure; or wherein the at least one radar radiation-forming mechanism is arranged in the emission direction of the light source.

14. The radar and light emission assembly according to claim 3, wherein the at least one radar radiation-forming mechanism is frequency-selective in that the radar radiation-forming mechanism comprises a frequency-selective radar passage structure; or wherein the at least one radar radiation-forming mechanism is arranged in the emission direction of the light source.

15. The radar and light emission assembly according to claim 2, wherein at least two radar radiation-forming regions, each comprising an individual radar radiation-forming function, are provided at the at least one radar radiation-forming mechanism.

16. A method according to claim 9, wherein the radar radiation-forming mechanism is a frequency-selective radar passage structure.

* * * * *